(12) United States Patent  
Reeves et al.

(10) Patent No.: US 8,185,936 B1
(45) Date of Patent: May 22, 2012

(54) AUTOMATIC DEVICE-PROFILE UPDATES BASED ON AUTHENTICATION FAILURES

(75) Inventors: Raymond Emilio Reeves, Olathe, KS (US); Ryan Alan Wick, Punta Gorda, FL (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 441 days.

(21) Appl. No.: 12/502,018

(22) Filed: Jul. 13, 2009

(51) Int. Cl.
*H04L 29/06* (2006.01)
*H04L 9/00* (2006.01)

(52) U.S. Cl. ............ 726/5; 726/6; 726/7; 726/8; 726/9; 726/10; 713/168; 713/169; 713/170; 713/171; 713/172

(58) Field of Classification Search ........................ 726/5
See application file for complete search history.

(56) References Cited

U.S. PATENT DOCUMENTS

2007/0143600 A1* 6/2007 Kellil et al. .................... 713/163
2007/0281665 A1* 12/2007 Cho et al. ...................... 455/411

* cited by examiner

*Primary Examiner* — Longbit Chai

(57) ABSTRACT

A method and medium are provided for automatically updating user profiles based on authentication failures associated with network-access requests from mobile communications devices. A mobile communications device requests access to a mobile network and the access is rejected due to an authentication failure. Upon communicating a rejection message to the mobile communications device, the authentication server communicates a network-access rejection notification to a user-profile updating server that resets network-generated authentication credentials and provides updated profiles containing reset credentials to a provisioning server. Subsequent access requests from the mobile device are handled through a dedicated profile-provisioning home agent until the device is updated, at which time network access can be granted through a more conventional home agent.

20 Claims, 6 Drawing Sheets

AUTOMATIC DEVICE-PROFILE UPDATES BASED ON AUTHENTICATION FAILURES

SUMMARY

Embodiments of the invention are defined by the claims below, not this summary. A high-level overview of embodiments of the invention are provided here for that reason, to provide an overview of the disclosure.

In a first aspect, a set of computer-executable instructions provides an exemplary method for automatically updating a device profile associated with a mobile communications device that is denied access to a mobile network. Embodiments of the exemplary method include receiving a network-access rejection notification from an authentication server. The authentication server sends the network-access rejection notification in response to rejecting a network-access request from a mobile communications device associated with a user. In embodiments, the network-access request includes a first authentication credential associated with a user profile. Embodiments of the exemplary method further include generating a second authentication credential and generating an updated user profile by replacing the first authentication credential with the second authentication credential. In an embodiment, the updated user profile is communicated to a provisioning server, which maintains the updated profile until the mobile device can be updated with the updated user profile.

In a second aspect, a set of computer-executable instructions provides another exemplary method for automatically updating a device profile associated with a mobile communications device that is denied access to a mobile network. In embodiments, the exemplary method includes receiving a network-access rejection notification corresponding to a network-access request from a mobile communications device having a first device profile that includes a first user profile associated with a first user. In embodiments, the first user profile includes a first authentication credential. According to various embodiments of the invention, a user-profile restoration server identifies a second mobile communications device associated with a second device profile that includes a second user profile associated with the first user. The second user profile includes a second authentication credential. In an embodiment, the exemplary method further includes updating the first and second user profiles by replacing the first and second authentication credentials with a third and fourth, network-generated authentication credential, respectively. The updated profiles can be communicated to a provisioning server for updating the first and second mobile communications devices.

In another aspect, a set of computer-executable instructions provides another exemplary method for automatically updating a device profile associated with a mobile communications device that is denied access to a mobile network. Embodiments of the exemplary method include receiving a network-access rejection notification corresponding to a network-access request from a mobile communications device. The exemplary method can further include updating user profiles associated with the corresponding mobile communications device. In some embodiments, all of the devices hosted by the network that are associated with the user are identified and updated profiles are generated for each device. In embodiments, all of the users associated with the mobile device are also identified and authentication credentials associated with each of those users are updated. Updated profiles are communicated to a provisioning server, and in some embodiments, a pending-update notification is sent to the authentication server so that a subsequent network-access request by one of the identified devices or users can be handled by granting access to the mobile network only through a dedicated profile-provisioning home agent until the device has been updated.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
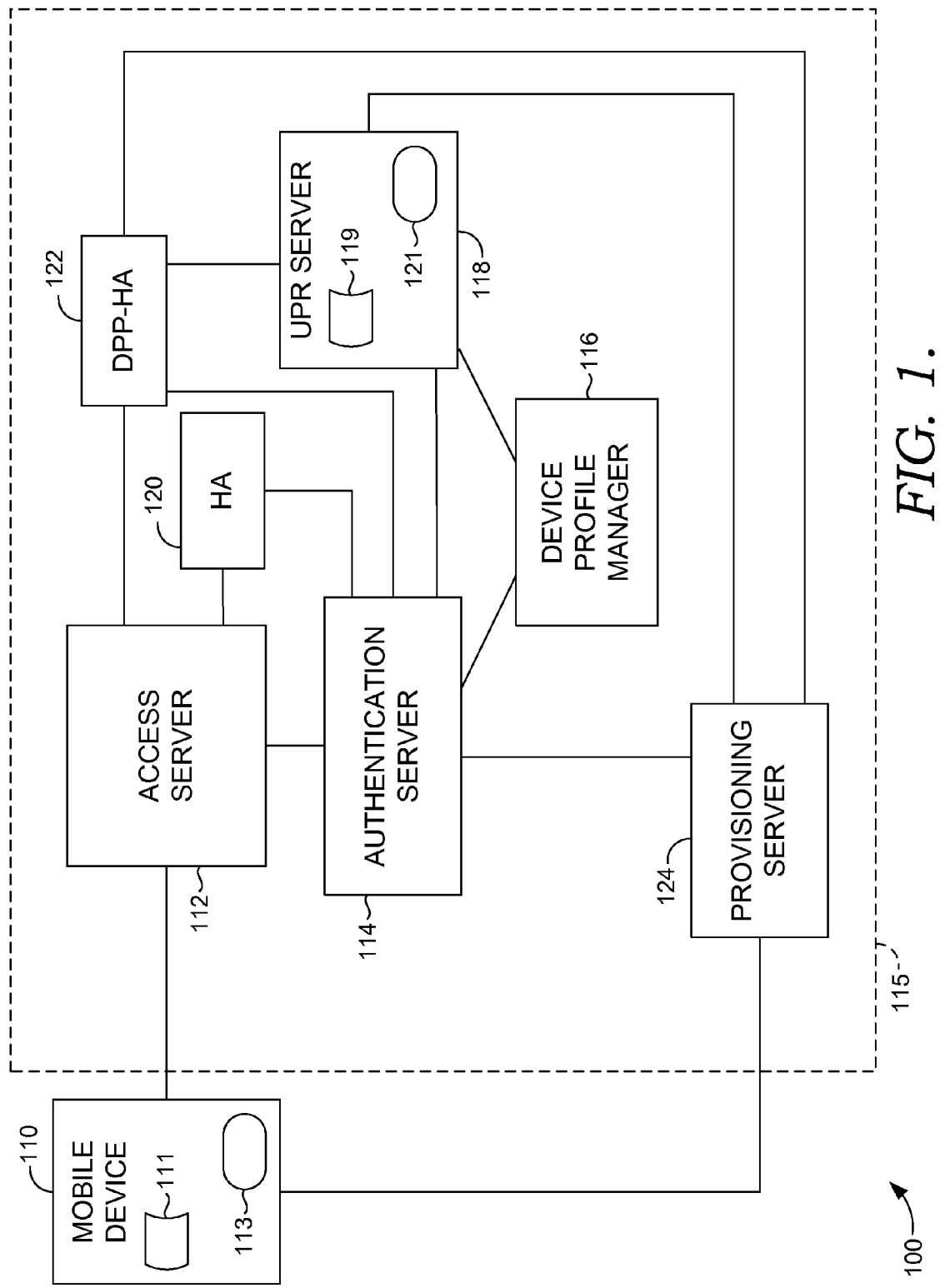
FIG. 1 depicts an illustrative network environment in accordance with embodiments of the present invention.

Embodiments of the present invention provide systems and methods for automatically updating a device profile associated with a mobile communications device that is denied access to a mobile network. By implementing embodiments of the invention, mobile network operators can automatically restore service capabilities to mobile devices without requiring the user to actively update authentication credentials, thereby mitigating potentially undesirable delays resulting from network-access rejections.

The subject matter of the present invention is described with specificity herein to meet statutory requirements. However, the description itself is not intended to limit the scope of this disclosure to only the embodiments described herein. Rather, the inventors have contemplated that the claimed subject matter might also be embodied in other ways, to include different steps or combinations of steps similar to the ones described in this document, in conjunction with other technologies. Moreover, although the terms "step" and/or "block" may be used herein to connote different components of methods employed, the terms should not be interpreted as implying any particular order among or between various steps herein disclosed except when the order of individual steps is explicitly asserted.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| CDMA | Code Division Multiple Access |
| CD-ROM | Compact Disc Read-Only Memory |
| DPP-HA | Dedicated Profile-Provisioning Home Agent |
| DPU-OTA | Device Profile Update Over-the-Air |
| DVD | Digital Versatile Disc |
| EDGE | Enhanced Data Rates for GSM Evolution |
| EEPROM | Electrically Erasable Programmable Read-Only Memory |
| EV-DO | Evolution-Data Optimized |
| GPRS | General Packet Radio Service |
| GSM | Global System for Mobile Communications |
| HA | Home Agent |
| OMA-DM | Open Mobile Alliance - Device Management |
| OTA | Over-the-Air |
| PDA | Personal Digital Assistant |
| RAM | Random Access Memory |
| ROM | Read-Only Memory |
| UMTS | Universal Mobile Telecommunications System |
| UPR | User Profile Restoration |
| Wi-Max | Worldwide Interoperability for Microwave Access |

Embodiments of the present invention may be embodied as, among other things: a method, system, device, or set of instructions embodied on one or more computer-readable media. Computer-readable media include both volatile and nonvolatile media, removable and nonremovable media, and contemplates media readable by a database, a switch, a server, a communications device and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Generally, program modules including routines, programs, objects, components, data structures, etc., refer to code that perform particular tasks or implement particular abstract data types when executed by a processor in a computer or other machine, such as a personal data assistant, cellular phone, portable media player, or other handheld device. Aspects of the invention may be practiced in a variety of system configurations, including hand-held devices, consumer electronics, general-purpose computers, more specialty computing devices, microcomputers (servers), mobile devices, personal digital assistants (PDAs), cellular phones, mobile media devices, and the like. Aspects of the invention may also be practiced in distributed computing environments where tasks are performed by remote-processing devices that are linked through a communications network.

Turning now to FIG. 1, an illustrative network environment 100 suitable for implementation of embodiments of the present invention is depicted. Illustrative network environment 100 includes a mobile device 110 that accesses a mobile network 115 through an access server 112. Mobile network 115 includes an authentication server 112, a device profile manager 116, a user-profile restoration (UPR) server 118, a home agent (HA) 120, a dedicated-profile provisioning home agent (DPP-HA) 122, and a provisioning server 124. The exemplary network environment 100 shown in FIG. 1 is an example of one suitable network environment 100 and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, in various embodiments, components of mobile network 115 can be implemented in any number of configurations, using any number of machines, and the like.

In embodiments of the present invention, mobile device 110 can be any kind of mobile communications device that includes radio equipment that facilitates the transmission of wireless communication signals to and from mobile device 110. Illustrative protocols that can be utilized in connection with embodiments of the present invention include CDMA, EDGE, EV-DO, GPRS, GSM, UMTS, Wi-Fi™, WiMAX, and the like. Radio equipment can facilitate wireless communications between mobile device 110 and a local, regional, national, or even global, telecommunications network. According to various embodiments of the invention, mobile device 110 includes computer-readable media 111 on which is embodied computer-executable instructions that, when executed by a processor 113 disposed within mobile device 110, cause mobile device 110 to perform various methods such as the illustrative methods described herein. Although not illustrated in FIG. 1 for purposes of clarity, any or all of the illustrated components 110, 112, 114, 116, 118, 120, 122, and 124 can include computer-readable media. For example, in embodiments, mobile device 110 can be a mobile phone, a personal digital assistant (PDA), a mobile computer, and the like.

Authentication server 114 authenticates users and mobile devices 110 on the mobile network 115. In embodiments, authentication server 114 can include other functions as well. For example, in one embodiment, authentication server 114 is an Authentication, Authorization, and Accounting (AAA) server that performs various authentication, authorization, and accounting tasks with respect to mobile network 115. In operation, authentication server 114 receives a network-access request from mobile device 110, which in some embodiments is communicated by way of access server 112. Authentication server 114 processes network-access requests to determine whether the request should be granted. In embodiments, for example, a network-access request includes authentication credentials associated with a user and/or mobile device 110. In some embodiments, authentication credentials can include usernames, passwords, device identifiers, and the like. Authentication server 114 compares authentication credentials received in a network-access request with authentication credentials maintained in user and/or device profiles to determine whether the network-access request is valid and whether the user and/or mobile device 110 should be granted access to various portions of mobile network 115.

In some embodiments, authentication server 114 references device profiles maintained by a device profile manager 116. Device profiles can include various types of information associated with a mobile device such as mobile device 110. In embodiments, device profiles include device identifiers, user profiles, user authentication credentials, additional information associated with users of the device, accounting information, service restrictions and permissions, security preferences, demographic information, communication history data, and the like. In some embodiments, device profile manager 116 and authentication server 114 can be implemented on a single machine, while in other embodiments, device profile manager 116 and authentication server 114 can be implemented on different machines. Device profile manager 116 can include various interfaces to other components of mobile network 115 so that device profile manager 116 can receive information and profile updates that pertain to device profiles maintained by device profile manager 116.

As is illustrated in FIG. 1, mobile network 115 further includes a user profile restoration (UPR) server 118. According to various embodiments of the invention, UPR server 118 includes computer-readable media 119 on which is embodied computer-executable instructions that, when executed by a processor 121 disposed within UPR server 118, cause UPR server 118 to perform various methods such as the illustrative methods described herein. UPR server 118 can receive network-access rejection notifications from authentication server 114. That is, upon rejecting a network-access request from mobile device 110, authentication server 114 communicates a notification of that rejection to UPR server 118. In embodiments, the network-access rejection notification can include various types of information such as authentication credentials, rejection information that indicates the reason or reasons for rejecting the network-access request, user profiles, device profiles, and the like. UPR server 118 can reference the network-access rejection notification to determine the reason(s) for the rejection and can generate updated system-generated information such as, for example, user profiles and device profiles. Exemplary reasons for network-access rejections in the context of embodiments of the present invention include, for example, an invalid password, expired password, unknown username, username restricted from mobile device, and the like.

UPR server 118 effectively resets the authentication information that mobile device 110 provides to mobile network 115 in an attempt to gain access to services associated therewith, thereby providing for automatic updating of device and user profiles in response to network-access rejections thereof. UPR server 118 provides device and user profile updates to a provisioning server 124, and can, in embodiments, provide a pending-update notification to authentication server 114 so that authentication server 114 knows that updates for a particular mobile device or user thereof are pending. In this manner, authentication server 114 can direct subsequent network-access acceptances through a dedicated profile-provisioning home agent (DPP-HA) 122 instead of a conventional home agent (HA) 120.

Provisioning server 124 facilitates over-the-air (OTA) provisioning and configuration for mobile device 110 such as, for example, by employing device management protocols like Open Mobile Alliance—Device Management (OMA-DM). For example, in some embodiments, provisioning server 124 is a device-profile update over the air (DPU-OTA) server. In embodiments, provisioning server 124 can be implemented on any number of computing devices, distributed computing systems, server banks, and the like. In some embodiments, provisioning server 124 facilitates device configuration, software upgrades, permissions and policies management functions, and the like.

DPP-HA 122 is a home agent (server) that is dedicated to enforcing profile provisioning flows incident to network-access requests. In embodiments, DPP-HA 122 ignores all communication traffic that does not directly correlate to profile provisioning activities and forces mobile device 110 to receive updated profiles from provisioning server 124 before being allowed access to a conventional home agent (HA) 120 and thus, any of the services hosted by or accessible through mobile network 115.

Embodiments of the invention illustrated above, and described in more detail below, can be implemented in various types of mobile network environments to improve network performance and user experience. In conventional mobile network environments, users often fail to gain access to mobile network services due to network-access rejections that can arise from various problems associated with network-generated authentication credentials. For example, a user attempting to access a mobile network may be rejected because, unbeknownst to the user, network-generated passwords, usernames, and the like are invalid, expired, or different than their counterparts maintained by the network for authentication purposes. Moreover, the inability of a user to gain access to a mobile network using a mobile communications device can persist due to conventional configurations.

Mobile communications devices (mobile devices) often have associated device profiles. Device profiles may include authentication credentials such as usernames, passwords, information about domains, and the like. In many cases, authentication credentials are included within user profiles, which can be contained in device profiles or maintained separately. Profile updates, authentication credential updates, and the like are often triggered by network events. Thus, if a mobile device fails to gain access to its associated mobile network, the network events required to cause such updates to the mobile device may never occur, which can result in a persistent inability to access the mobile network. Additionally, there are occasions where authentication credentials associated with a user get stolen or inadvertently provisioned on the wrong mobile device. These, and other, situations can result in a large number of network-access rejections that can be minimized by exploiting data available in authentication messages such as, for example, network-access rejection notifications.

Various aspects of embodiments of the present invention provide enhancements to conventional mobile network environments. For example, in an embodiment, the present invention includes an enhancement to behavior associated with authentication servers. In embodiments, authentication messages (e.g., network-access rejections) are used as a trigger by a user profile restoration server to automatically remedy detected conditions associated with network-generated authentication credentials. According to various embodiments of the invention, when an authentication server rejects an access request from a mobile device, the authentication server also notifies a user profile restoration (UPR) server of the rejection. The UPR server determines what caused the rejection, and generates updated authentication credentials to remedy the problem. In some embodiments, subsequent attempts to access the network can be handled by allowing access only to a dedicated profile-provisioning home agent (DPP-HA) that ignores any traffic not related to provisioning. In this manner, the mobile device can be updated before it is allowed access to other aspects of the mobile network. Moreover, in some instances, a single user may use more than one mobile device. In embodiments, the UPR server identifies all other mobile devices that the user uses and updates the authentication credentials associated with each of those, as well. Furthermore, in some embodiments, more than one user may use, probably at different times, the mobile device. In embodiments, the UPR server can update the authentication credentials corresponding to each user of the mobile device.

Figure 2:
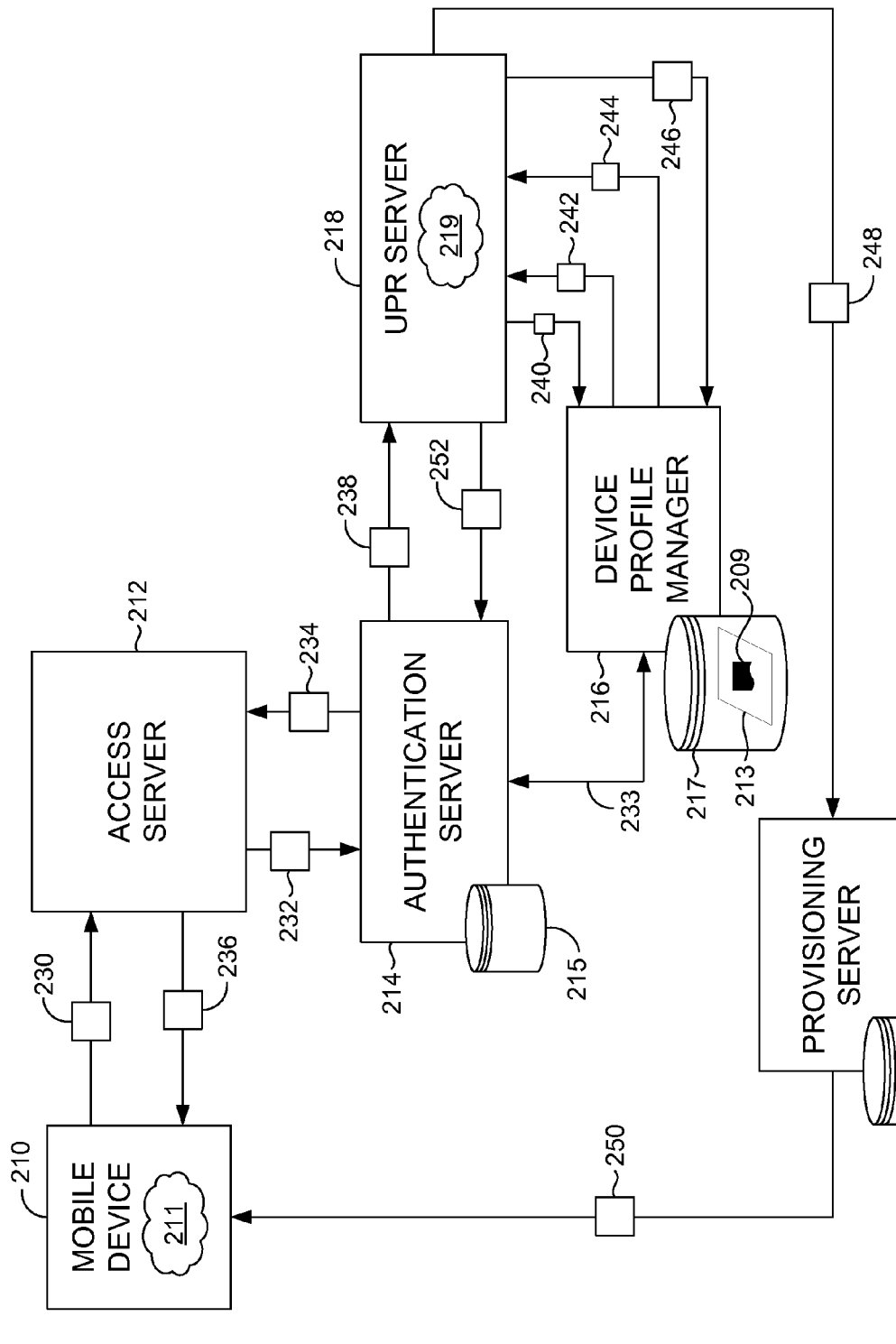
FIG. 2 depicts a first aspect of an exemplary implementation of embodiments of the present invention.
Figure 3:
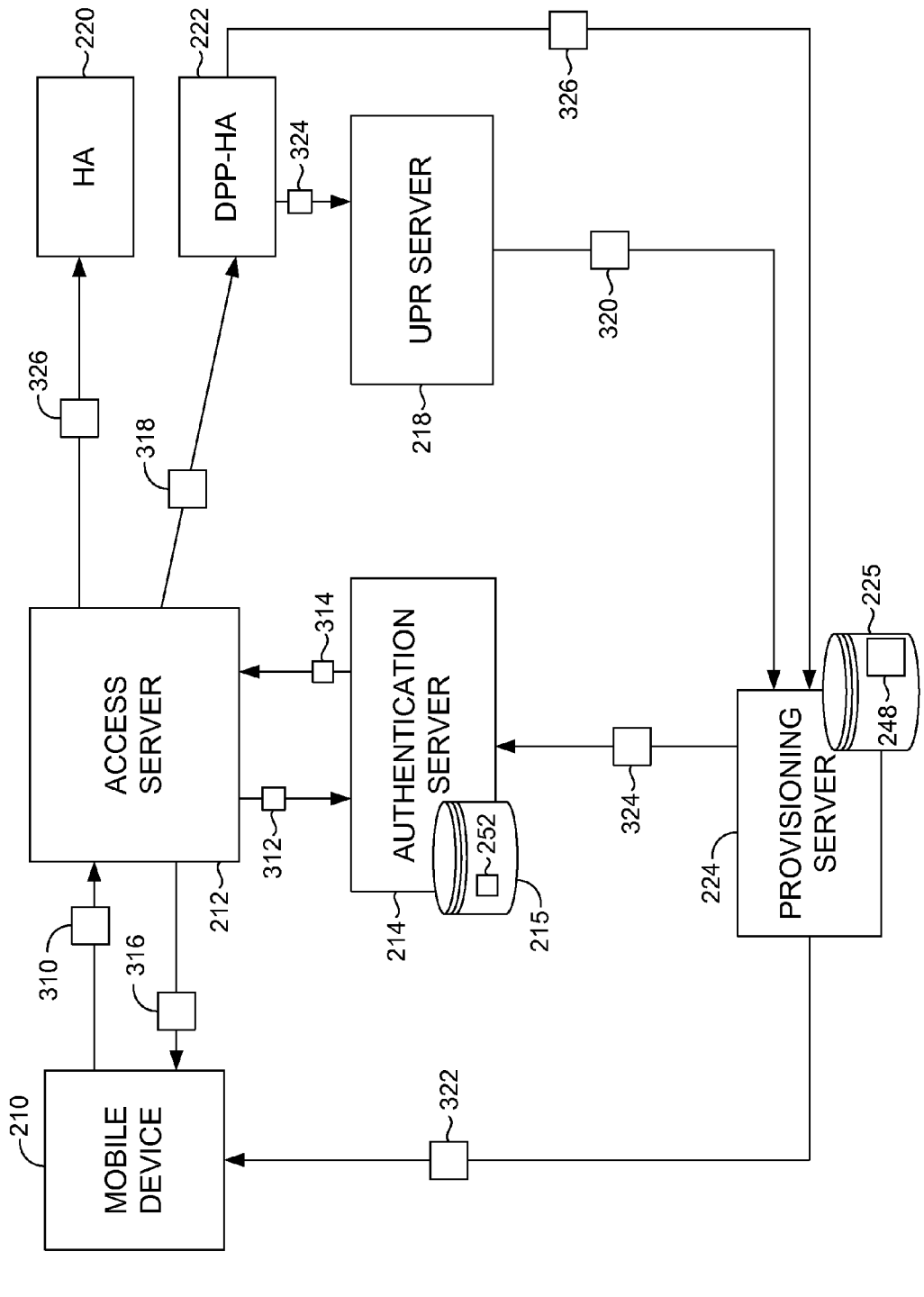
FIG. 3 depicts another aspect of an exemplary implementation of embodiments of the present invention.

Turning now to FIGS. 2 and 3, an illustrative implementation 200 of aspects of an embodiment of the invention is depicted. With reference to FIG. 2, illustrative implementation 200 includes a mobile device 210, an access server 212, an authentication server 214, a device profile manager 216, a user profile restoration (UPR) server 218, and a provisioning server 224. As illustrated in FIG. 2, mobile device 210 sends a network-access request 230 to access server 212. The network-access request 230 is a request sent by mobile device 210 (sometimes on behalf of, or as directed by, a user) to gain access to some aspect of a mobile network such as, for example, services, applications, updates, and the like. In embodiments, the network-access request 230 can include various types of information associated with mobile device 210 and/or a user or users thereof. For example, in embodiments, network-access request 230 includes authentication credentials such as a username, a password, a device identifier, and the like. In embodiments, access server 212 communicates with authentication server 214 to determine whether to grant network-access request 230. In an embodiment, access server 212 provides authentication credentials 232 received from mobile device 210 to authentication server 214. Authentication server 214 compares 233 the authentication credentials 232 with credentials stored within a user profile 209 and/or device profile 213. In embodiments, authentication server 214 can include, or communicate with, a data store 215 that maintains device and user profiles, credentials, and other information. In other embodiments, authentication server 214 communicates with device profile manager 216 to compare authentication credentials. According to various embodiments, device profile manager 216 can include a database, a server, a program module, and the like. Device profile manager 216 maintains device profiles 213. In embodiments, device profiles 213 are stored in a data store 217 associated with device profile manager 216. In still further embodiments, device profile manager 216 can be integrated with authentication server 214.

Upon determining whether the mobile device 210 and its corresponding user should be granted access to mobile network 215, authentication server 214 communicates either a network-access accept or network-access reject message 234 to mobile device 210 via access server 212. In embodiments, authentication server 214 might determine that a network-access request 230 from mobile device 210 should be rejected for any number of reasons. Illustrative reasons include, for example, an invalid username, an invalid password, expired authentication credentials, service restrictions associated with a particular user, and the like. Upon determining that a network-access request 230 from mobile device 210 should be rejected, authentication server 214 provides a network-access rejection message 234 to access server 212, which notifies mobile device 210 of the rejection by communicating a network-access rejection 236 to mobile device 210. Additionally, authentication server 214 communicates a network-access rejection notification 238 to UPR server 218. The network-access rejection notification 238 can include authentication credentials associated with a user profile and/or a device profile corresponding to mobile device 210.

UPR server 218 processes the network-access rejection notification 238 to determine why the corresponding network-access request was rejected. In embodiments, UPR server 218 communicates a request 240 for a synchronization of all service databases on mobile network 215. In embodiments, UPR server 218 resets authentication credentials provided in the network-access rejection notification 238. According to various embodiments of the invention, UPR server 218 communicates with device profile manager 216 to identifies all mobile devices associated with the user as well as all users associated with mobile device 210. In response, device profile manager 216 references device profiles stored in a data store 217 and provides a list 242 of devices associated with the rejected user and a list 244 of users associated with mobile device 210 to UPR server 218. In this way, UPR server 218 can regenerate network-generated data such as authentication credentials associated with each of the identified users and devices. In some embodiments, UPR server 218 updates appropriate user profiles with the regenerated authentication credentials. UPR server 218 provides the updated user profiles 246 to device profile manager 216, which can maintain the updated profiles 246 in device profiles 213 stored in a data store 217.

As is further illustrated in FIG. 2, UPR server 218 also communicates the updated user profiles 248 (or, in embodiments, authentication credentials, device profiles, etc.) to provisioning server 224. If any of the mobile devices corresponding to the profile updates are available (e.g., connected to mobile network 215 or access server 212), provisioning server 224 can immediately update the configuration of the mobile device(s) with updated profiles 250. For mobile devices not immediately available, provisioning server 224 can maintain the updates in a data store 225 until the mobile devices can be updated. In embodiments, UPR server 218 also communicates a pending-update notification 252 to authentication server 214 so that authentication server 214 knows to restrict a further access attempt by one of the identified devices and/or users to provisioning flows until the device is updated.

Turning now to FIG. 3, the illustrative implementation 200 further includes processes for updating mobile device 210 while preventing general access to mobile network 215 by mobile device 210. In embodiments, mobile device 210 communicates 310 a network-access request to access server 212. Access server 212 submits a query 312 to authentication server 214 to determine whether access should be granted based on authentication credentials provided with the network-access request. In an embodiment, authentication server 214 may determine, by referencing a pending-update notification 252 in data store 215, that there is a profile update pending for mobile device 210. Instead of granting access to services hosted by mobile network 215, authentication server 214 can be configured to grant only limited access to mobile device 210 for the purpose of enforcing provisioning by provisioning server 224.

Accordingly, in embodiments, authentication server 214 communicates a network-access accept message 314 to access server 212 that indicates that access is only to be granted via a dedicated profile-provisioning home agent (DPP-HA) 222. DPP-HA 222 can be configured similarly to other, more conventional, home agents (e.g., HA 220). In embodiments, DPP-HA 222 is configured to ignore any communication not related to provisioning. In embodiments, DPP-HA 222 invokes 320 provisioning server 224 so that provisioning server 224 can update 322 mobile device with updated profiles 248 stored in data store 225 using over-the-air (OTA) provisioning 226. In some embodiments of the invention, DPP-HA 222 can communicate with UPR server 218, where UPR server 218 invokes provisioning server 224. Provisioning server 224 communicates updates 322 to mobile device 210. Provisioning server 224 can, in embodiments, communicate a notification 324 to authentication server 214 to remove restrictions on mobile device 210. In turn, subsequent network-access requests by mobile device 210 may be accepted and services can be provided to mobile device 210 through conventional home agents such as, for example, HA 220.

Figure 4:
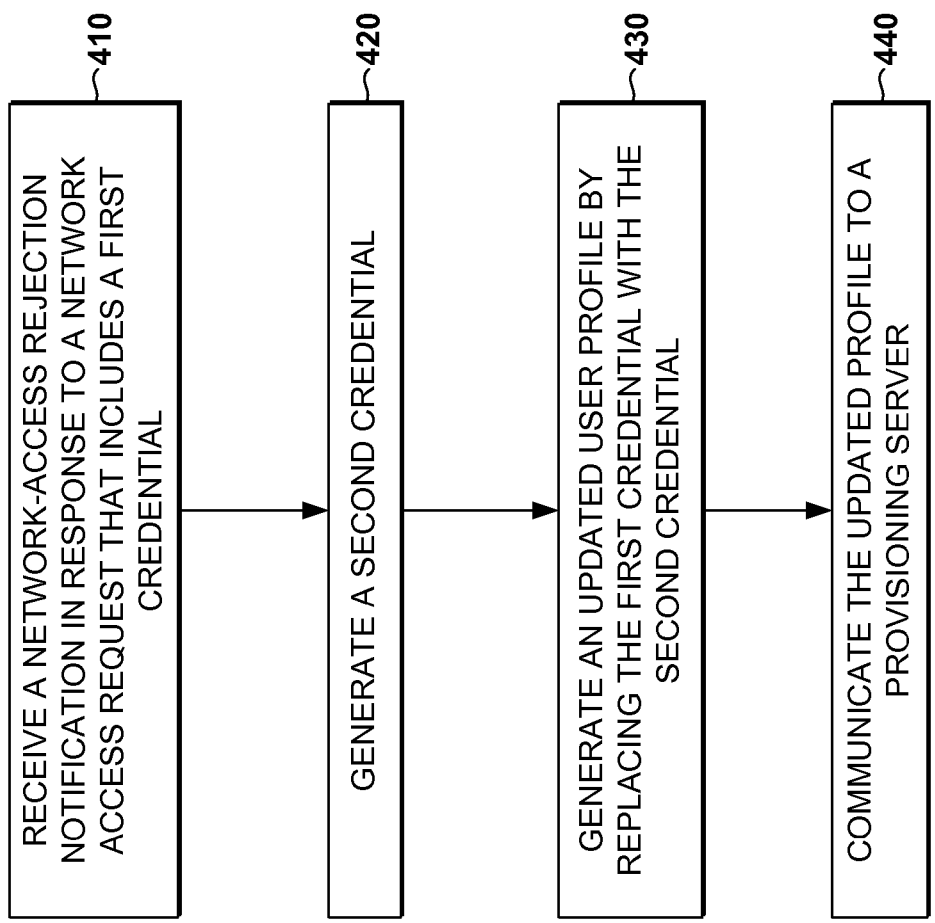
FIG. 4 depicts an illustrative method of automatically updating a device profile associated with a mobile communications device in accordance with embodiments of the present invention.

To recapitulate, we have described a computing system, a communications device, a network environment, and methods for automatically updating device profiles based on network access failures. Turning to FIG. 4, a flow diagram is provided, showing an illustrative method 400 of automatically updating a device profile associated with a mobile communications device that requests access to a mobile network, wherein the device profile includes a first user profile associated with a first user, the first user profile comprising at least one authentication credential generated by the mobile network. According to embodiments of the illustrative method 400, an exemplary step, step 410, includes receiving a network-access rejection notification from an authentication server. In embodiments, the authentication server generates the network-access rejection and communicates a notification of the rejection to a user-profile restoration (UPR) server in response to a network-access request from the mobile communications device. The network-access request includes a first authentication credential associated with a first user of the first mobile communications device.

In embodiments of the invention, the mobile network can maintain device profiles that include user profiles and other information. Authentication credentials can be associated with device profiles, user profiles, and the like. In some embodiments, a user or device profile can include a number of authentication credentials used for gaining access to different types of services. In further embodiments, authentication credentials can be generated by the mobile network, generated or altered by the user, or generated by some other entity such as, for example, a content provider, internet service provider, and the like.

At step 420, the UPR server generates a second authentication credential in response to receiving the network-access rejection notification. As illustrated at step 430, the UPR server generates an updated user profile by replacing the first authentication credential with the second authentication credential. In embodiments, the first and second authentication credentials can include user identifiers, usernames, passwords, device identifiers, and the like. At a final illustrative step, step 440, the updated user profile is communicated to a provisioning server. In embodiments, the provisioning server updates the mobile device with the updated user profile the next time the mobile device attempts to access the mobile network. In an embodiment, the provisioning server can immediately update a mobile device if that device is available. In some embodiments, the UPR server identifies additional devices that the user uses and regenerates authentication credentials for those devices as well. In further embodiments, the UPR server identifies additional users that use the first mobile device and generates updated user profiles for those users as well.

Figure 5:
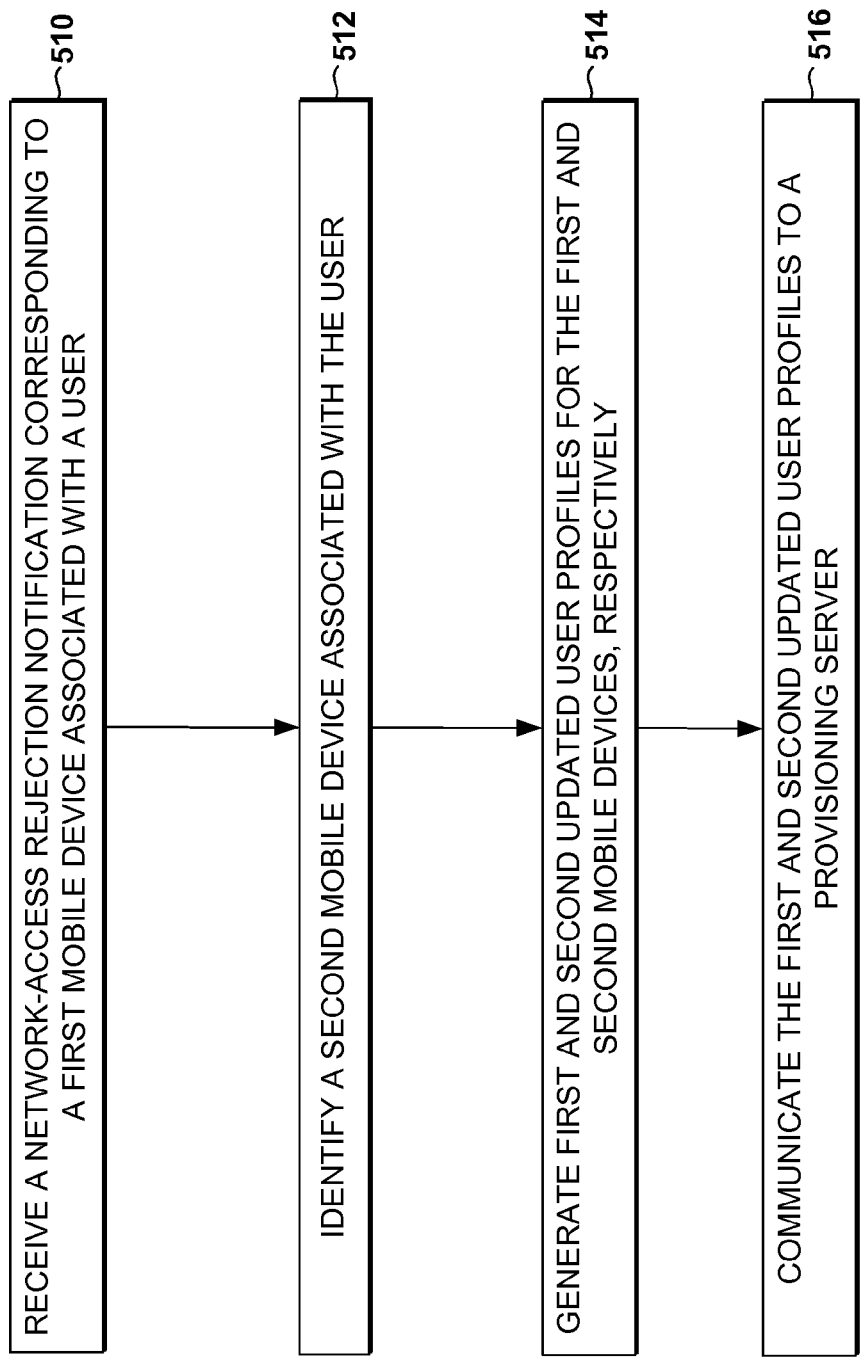
FIG. 5 depicts another illustrative method of automatically updating a device profile associated with a mobile communications device in accordance with embodiments of the present invention.

Turning now to FIG. 5, a flow diagram showing another illustrative method 500 of automatically updating user and device profiles. According to various embodiments of the illustrative method 500, a first illustrative step, step 510, includes receiving a network-access rejection notification from an authentication server. In embodiments, the authentication server generates the network-access rejection in response to a network-access request from a first mobile device associated with a first device profile. According to embodiments of the invention, the first associated device profile includes a first user profile associated with a first user of the mobile device. Furthermore, in various embodiments, the first user profile includes a first network-generated authentication credential.

As shown at step 512, embodiments of the illustrative method further include identifying a second mobile communications device associated with a second device profile. In embodiments, the second device profile includes a second user profile associated with the first user. The second user profile can include a second network-generated authentication credential. In some embodiments, the second authentication credential is different than the first authentication credential. In other embodiments, the second authentication credential is the same as the first authentication credential. Moreover, in various embodiments, each user profile can include a number of authentication credentials.

At step 514, a first and a second updated user profile are generated by replacing the first and second authentication credentials with a third and a fourth network-generated authentication credential, respectively. In some embodiments, the first and second authentication credentials can be the same, while in other embodiments, the first and second authentication credentials are different. At a final illustrative step, step 516, the first and second updated user profiles are communicated to a provisioning server. In embodiments, the provisioning server maintains the updated profiles as pending until each of the mobile devices can be updated. According to various embodiments of the present invention, any number of authentication credentials can be updated according to embodiments of the processes described above. In further embodiments, the operations described herein can be transparent to the user, while in still further embodiments, the user can be notified of updated profiles, reasons for access failures, and the like. In some embodiments, users can be prompted to select or enter a new authentication credential.

Figure 6:
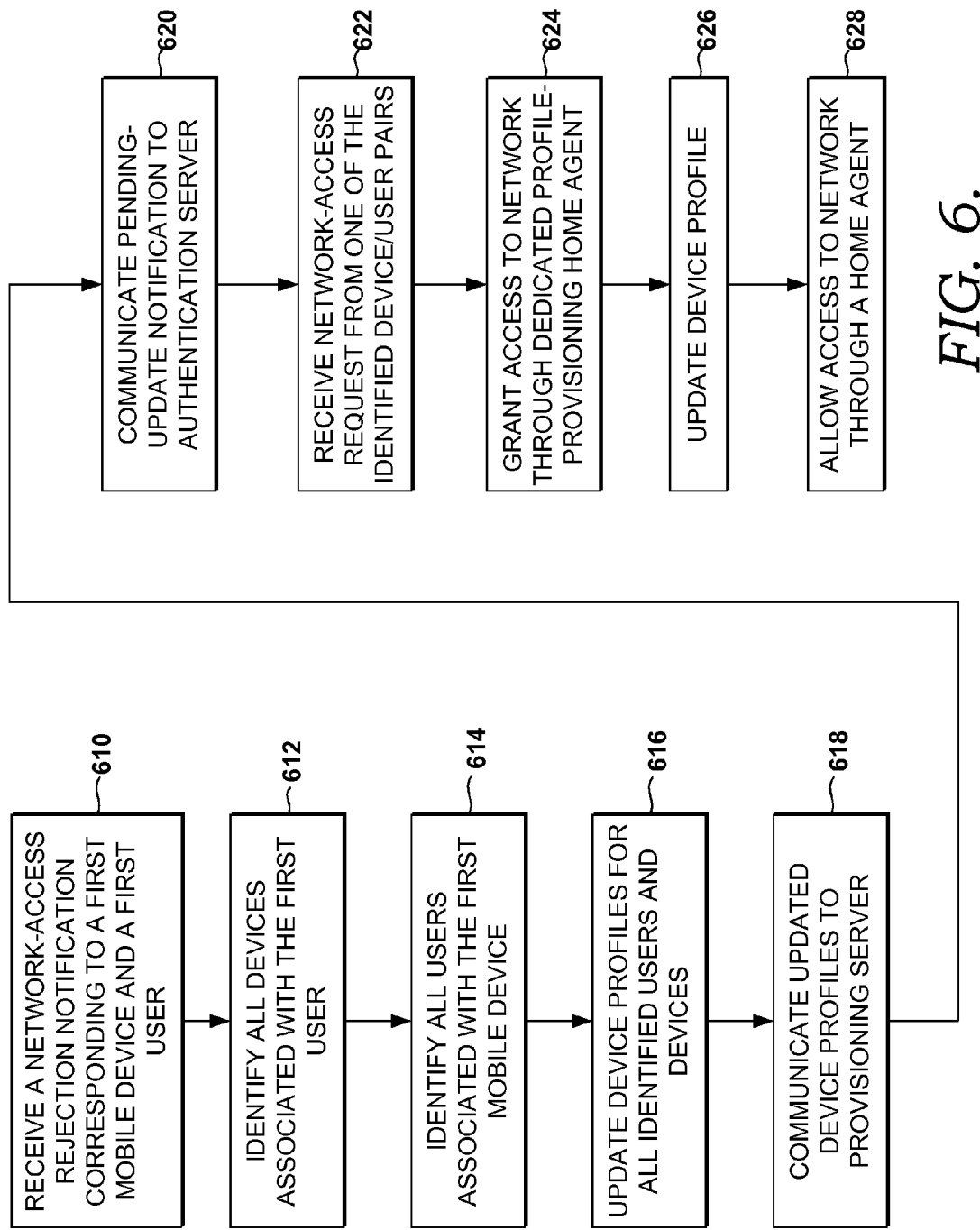
FIG. 6 depicts another illustrative method of automatically updating a device profile associated with a mobile communications device in accordance with embodiments of the present invention.

Turning now to FIG. 6, a flow diagram showing another illustrative method 600 of automatically updating user and device profiles. According to various embodiments of the illustrative method 600, a first illustrative step, step 610, includes receiving a network-access rejection notification corresponding to a first mobile device and a first user. At step 612, a list of devices associated with the user is identified and, at step 614, a list of users associated with the first mobile device is identified. At step 616, device profiles for the listed devices and users are generated. In an embodiment, step 616 includes regenerating any network-generated data included in the user or device profile. In some embodiments, only certain types of authentication credentials are updated. As shown at step 618, the updated device profiles are communicated to a provisioning server, and at step 620, a pending-update notification is communicated to the authentication server.

With continued reference to FIG. 6, a subsequent network-access request is received from one of the identified device/user pairs listed above, as shown at step 622. At step 624, the authentication server grants access through a dedicated profile-provisioning home agent instead of a conventional home agent. The dedicated home agent invokes the provisioning server and, as shown at step 626, the device profiles are updated. In embodiments, a notification is provided to the authentication server to indicate that the provisioning restrictions should be removed from the corresponding device profile. At an illustrative final step, step 628, the mobile device can be allowed access to the mobile network through a home agent that is not dedicated to profile provisioning.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention.

It will be further understood that certain features and subcombinations are of utility and may be employed without reference to other features and subcombinations and are contemplated within the scope of the claims.

The invention claimed is:

1. One or more non-transitory computer-readable media having computer-executable instructions embodied thereon for performing a method of automatically updating a first device profile associated with a first mobile communications device that requests access to a mobile network, wherein the first device profile includes a first user profile associated with a first user, the first user profile comprising at least one authentication credential generated by the mobile network, the method comprising:

receiving, at a user-profile restoration server, a network-access rejection notification from an authentication server, wherein the authentication server generated the network-access rejection in response to a network access request from a first mobile communications device, wherein the network access request includes a first authentication credential associated with a first user of the first mobile communications device;

generating, at the user-profile restoration server, a second authentication credential in response to receiving the network-access rejection notification;

generating, at the user-profile restoration server, a first updated user profile by replacing the first authentication credential in the first user profile with the second authentication credential; and communicating the first updated user profile to a provisioning server so as to maintain the first updated user profile as pending until the first mobile communications device can be updated with the first updated user profile.

2. The media of claim 1, wherein the first authentication credential comprises at least one of a first username and a first password.

3. The media of claim 2, wherein the authentication server communicates the network-access rejection notification to the user-profile restoration server when the authentication server communicates a network-access rejection message to the first mobile communications device.

4. The media of claim 1, wherein the provisioning server maintains the first updated user profile as pending until the first mobile communications device can be updated with the first updated user profile.

5. The media of claim 1, further comprising identifying a second mobile communications device associated with the first user, wherein identifying the second mobile communications device comprises determining that a second device profile, which corresponds to the second mobile communications device, includes a second user profile associated with the first user.

6. The media of claim 5, further comprising generating a second updated user profile, wherein generating the second updated user profile comprises replacing a third authentication credential in the second user profile with a fourth authentication credential.

7. The media of claim 6, further comprising communicating the second updated user profile to the provisioning server, wherein the provisioning server maintains each of the first and second updated user profiles as pending until each of the first and second mobile communications devices can be updated with the first and second updated user profiles, respectively.

8. The media of claim 1, further comprising identifying a second user associated with the first mobile communications device.

9. The media of claim 8, wherein identifying the second user comprises determining that the first device profile includes a third user profile, the third user profile being associated with a second user, wherein the third user profile comprises a fifth authentication credential generated by the mobile network.

10. The media of claim 9, further comprising generating a third updated user profile by replacing the fifth authentication credential with a sixth authentication credential.

11. One or more non-transitory computer-readable media having computer-executable instructions embodied thereon for performing a method of automatically updating a first device profile associated with a first mobile communications device that requests access to a mobile network, wherein the first device profile includes a first user profile associated with a first user, the first user profile comprising at least one authentication credential generated by the mobile network, the method comprising:

receiving a network-access rejection notification, at a user-profile restoration server, from an authentication server, wherein the authentication server generates the network-access rejection in response to a network access request from a first mobile communications device associated with a first associated device profile, the first associated device profile comprising a first user profile associated with a first user of the first mobile communications device, wherein the first user profile includes a first network-generated authentication credential corresponding to the first user;

identifying a second mobile communications device associated with a second device profile, wherein the second device profile comprises a second user profile associated with the first user, the second user profile including a second network-generated authentication credential;

generating, at the user-profile restoration server, a first updated user profile and a second updated user profile, wherein generating the first and second updated user profiles comprises replacing the first and second authentication credentials with a third and a fourth authentication credentials, respectively; and communicating the first and second updated user profiles to a provisioning server, wherein the provisioning server maintains each of the first and second updated user profiles as pending until each of the first and second mobile communications devices can be updated with the first and second updated user profiles, respectively.

12. The media of claim 11, further comprising identifying a third user profile within the first device profile, wherein the third user profile is associated with a second user of the first mobile communications device, the third user profile including a fifth authentication credential.

13. The media of claim 12, further comprising generating a third updated user profile by replacing the fifth authentication credential with a sixth authentication credential.

14. The media of claim 11, further comprising communicating the third updated user profile to the provisioning server, wherein the provisioning server maintains the third updated user profile as pending until the first mobile communications device can be updated with the third updated user profile.

15. The media of claim 11, further comprising communicating a pending-update notification associated with each of the first and second updated user profiles to the authentication server, each pending-update notification comprising a notification that the associated user profile is pending, wherein the authentication server restricts network access by the first and second mobile communications devices to access through a profile-provisioning dedicated home agent until the first and second mobile communications devices can be updated.

16. One or more non-transitory computer-readable media having computer-executable instructions embodied thereon for performing a method of automatically updating a plurality of device profiles, each device profile being associated with a mobile communications device, wherein each device profile includes a user profile corresponding to a user of the mobile communications device, the user profile comprising at least one authentication credential that is associated with a user and that is generated by the mobile network, the method comprising:

receiving a network-access rejection notification, at a user-profile restoration server, from an authentication server, wherein the authentication server generates the network-access rejection in response to a network access request from a first mobile communications device associated with a first device profile, the first device profile comprising a first network-generated authentication credential corresponding to a first user;

identifying a second mobile communications device associated with a second device profile, wherein the second device profile comprises a second user profile corresponding to the first user, the second user profile comprising a second network-generated authentication credential corresponding to the first user;

generating, at the user-profile restoration server, a third authentication credential corresponding to the first user in response to receiving the network-access rejection notification;

generating, at the user-profile restoration server, a fourth authentication credential corresponding to the first user in response to receiving the network-access rejection notification;

generating, at the user-profile restoration server, a first updated user profile by replacing the first authentication credential with the third authentication credential;

generating, at the user-profile restoration server, a second updated user profile by replacing the second authentication credential with the fourth authentication credential;

communicating the first and second updated user profiles to a provisioning server, wherein the provisioning server maintains each of the first and second updated user profiles as pending until each of the first and second mobile communications devices can be updated with the first and second updated user profiles, respectively; and communicating a pending-update notification associated with each of the first and second updated user profiles to the authentication server, each pending-update notification comprising a notification that the associated user profile is pending, wherein the authentication server restricts network access by the first and second mobile communications devices to access through a dedicated profile-provisioning home agent until the first and second mobile communications devices can be updated.

17. The media of claim 16, further comprising identifying a second user of the first mobile communications device by determining that the first device profile includes a third user profile, the third user profile being associated with the second user, and wherein the third user profile comprises a fifth authentication credential generated by the mobile network.

18. The media of claim 17, further comprising generating a third updated user profile by replacing the fifth authentication credential with the sixth authentication credential.

19. The media of claim 18, further comprising communicating the third updated user profile to the provisioning server, wherein the provisioning server provides the first and third updated user profiles to the first mobile communications device in response to being invoked by a dedicated profile-provisioning home agent.

20. The media of claim 19, wherein the dedicated profile-provisioning home agent invokes the provisioning server in response to a subsequent network-access request received from the first mobile communications device.

* * * * *